United States Patent [19]
Harada et al.

[11] Patent Number: 4,487,428
[45] Date of Patent: Dec. 11, 1984

[54] CONVERTIBLE STROLLER

[76] Inventors: Steve N. Harada; Kathleen L. Harada, both of P.O. Box 798, Coupeville, Wash. 98239

[21] Appl. No.: 429,253

[22] Filed: Sep. 30, 1982

[51] Int. Cl.³ .............................................. B62B 7/12
[52] U.S. Cl. ..................................... 280/648; 280/649; D12/129
[58] Field of Search .................. 280/644, 650, 642, 30, 280/649, 648; 224/153; 248/166, 188.6; 211/195; D3/31, 32; D12/129

[56] References Cited

U.S. PATENT DOCUMENTS

| | | | |
|---|---|---|---|
| D. 160,598 | 10/1950 | Heideman | D12/129 |
| 956,399 | 4/1910 | Morse | 248/166 X |
| 1,718,962 | 7/1929 | Kimball | 280/47.26 X |
| 3,984,115 | 10/1976 | Miller | 280/30 |
| 4,111,454 | 9/1978 | Kassai | 280/649 |
| 4,157,837 | 6/1979 | Kao | 280/30 |
| 4,256,325 | 3/1981 | Fleischer | 280/650 X |

FOREIGN PATENT DOCUMENTS 84948  1/1955  Norway .............. 280/644

*Primary Examiner*—Joseph F. Peters, Jr.
*Assistant Examiner*—Michael Mar
*Attorney, Agent, or Firm*—Cole, Jensen & Puntigam

[57] ABSTRACT

A stroller including the known and accepted structure of wheels, handle and a rigid frame which supports a baby containing seat, enhanced by the fact that several selected ones of the individual elements comprising the frame which are rigid when in use, are selectively articulated and folded back on themselves lessening the exterior dimension and permitting the stroller to be used as a back and shoulder supported carrying device and further capable of being totally collapsed to a relatively flat non-bulky condition for storage.

6 Claims, 9 Drawing Figures

FIG. 5
FIG. 6
FIG. 7
FIG. 8
FIG. 9
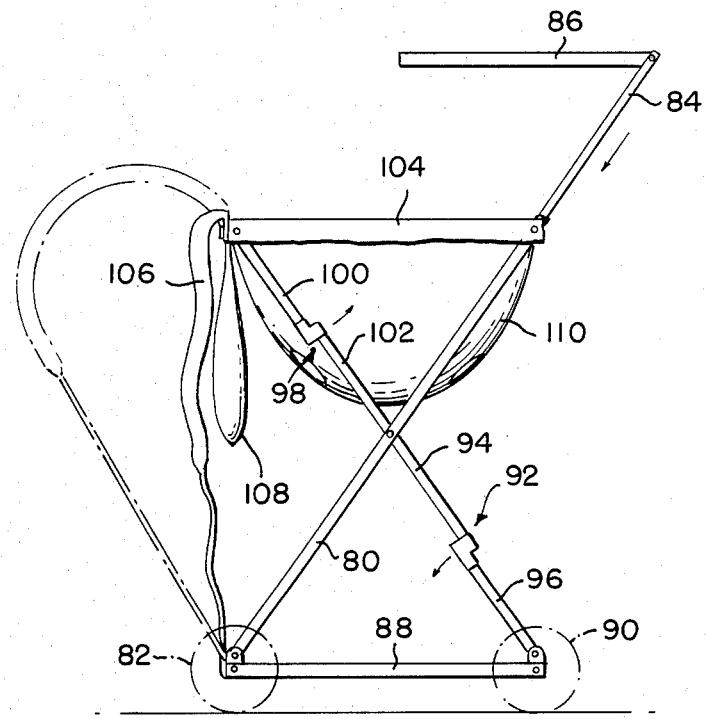
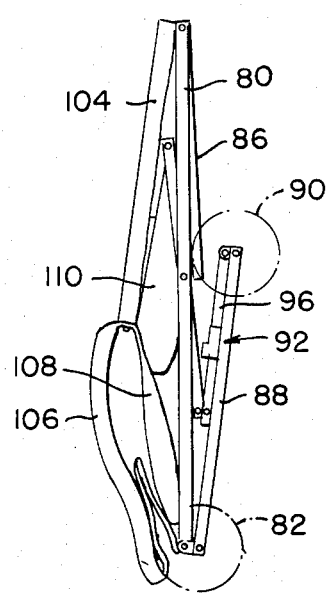
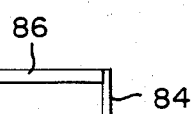
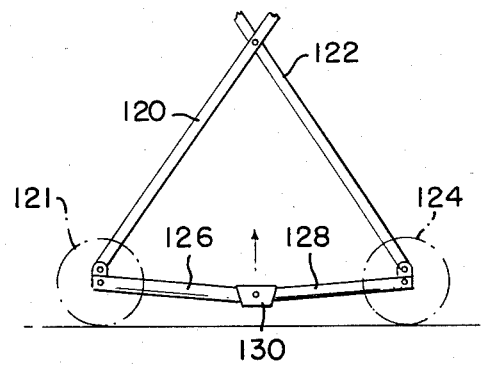
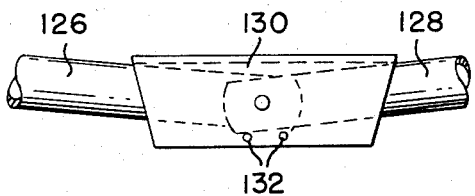

CONVERTIBLE STROLLER

BACKGROUND OF THE INVENTION

Strollers, perambulators and other devices for transporting children with less physical strain for the parents and greater comfort for the child are well known.

Traditionally, strollers have necessarily been rigid and somewhat bulky so that in use they would provide proper support for the child and keep the risk of injury to the child to a minimum. As a contra to the requirement for rigidity, since space has become a premium, it is extremely desirable that the strollers be collapsible such that they may easily be stored or transported when not in use.

The desirability and convenience of transporting children on the back of an adult is likewise well known and in the past, devices have been manufactured which essentially convert a backpack frame to a child carrier through the utilization of modified support and enclosing structure. These backpack/carrying devices are necessarily limited in that they are not easily converted for other carrying purposes and in general do not collapse. It is therefore not convenient to store the devices when it is no longer necessary to carry the child on the back.

Prior art known to the applicant include U.S. Pat. No. 3,984,115 granted to Miller which discloses a four wheeled stroller wherein the wheel supporting legs are selectively collapsible upwardly transforming the stroller into a rigid backpack child carrying device.

U.S. Pat. No. 4,157,837 granted to Kao on June 12, 1979 discloses a two-wheeled stroller having a rigid child enclosing framework wherein the handle may be collapsed downwardly allowing the device to be utilized as a backpack type carrier.

With the above noted prior art and the limitations thereof in mind, it is an object of the present invention to provide a device which is rigid and safe to use as a stroller but which likewise may be easily partially collapsed and used as a backpack type carrier and further, totally collapsed to a convenient compact size for storage.

It is another object of the present invention to provide a stroller with a unitary rigid main frame member and auxiliary frame members pivotally secured thereto such that the entire device may be collapsed for transport and convenient storage.

It is yet another object of the present invention to provide a lightweight collapsible stroller which includes all of the features necessary for the safety and comfort of the child.

Still a further object of the present invention is to provide a stroller including selectively articulated support frame member permitting the stroller to be partially or totally collapsed.

BRIEF DESCRIPTION OF THE DRAWINGS

FIG. 5 is a side elevation view of an alternate stroller embodiment.

FIG. 6 is a side elevation view of the stroller of FIG. 5 in the collapsed condition.

FIG. 7 is a rear elevation view of a stroller of FIG. 5.

FIG. 8 is a partial view of an alternative structure enabling the stroller to assume the collapsed position.

FIG. 9 is an enlarged view of the overcenter hinge mechanism of FIG. 8.

DETAILED DESCRIPTION OF THE DRAWINGS

Figure 1:
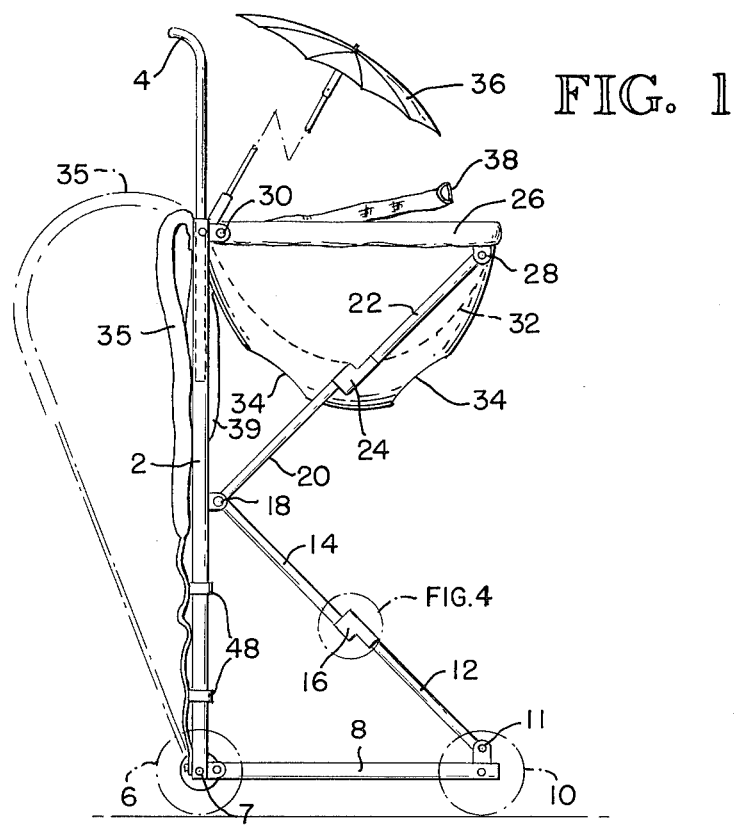
FIG. 1 is a side elevation of one embodiment of the present invention illustrating the structure which enables the stroller to be selectively collapsed.

Referring now to FIG. 1, the inventive convertible, collapsible backpack stroller combination in one embodiment is seen as including a rigid substantially vertical, upright adjustable telescoping member 2 which includes a handle member 4, at its upper end and a standard set of wheels be they singular or dual 6 at its lower end. Immediately adjacent the lower end of the rigid element 2 is a pair of selectively articulated forwardly extending arms 8 having secured to the outer end thereof, wheels 10 which are identical to the wheel 6 at the bottom of the main frame member 2. It is to be understood that the sets of wheels may be pivotally attached and may include brakes. A collapsible linking member, having sections 12 and 14 joined by a locking hinge member 16, is pivotally connected to the main frame member 2 at a point 18 intermediate the ends of the frame member. The particular location of the hinge/joints 7, 11, 16 and 18 allow the arm comprising elements 12 and 14 to be collapsed against the frame member 2 and the forwardly extending arms 8 to rotate upwardly to a position adjacent the frame 2. In this condition, as will be explained hereinafter, the lower collapsible frame is secured in position and the backpack carrier is now in the proper configuration for being used as a backpack carrier.

At a hinge point 18, which need not be identical with the previously described hinge point, a second diagonal arm comprising elements 20, 22 joined by locking hinge member 24 extends diagonally upwardly to support rearwardly extending horizontal frame member 26 which is pivotally connected to frame element 22 at 28 and to frame member 2 at 30 such that this structure may likewise be collapsed against the main frame member 2. The articulated support comprising elements 20, 22 and horizontal rectangular frame member 26 serve as a support (see FIG. 3) for a baby carrier sling or seat device 32 having openings 34 foreand aft such that the baby may be placed facing forwardly or rearwardly. It is to be understood that the seat is adjustable, see phantom lines, and removable and further that the frame member 26 is preferably covered with a removable pad.

Also as seen in this view, there is provided a pair of padded shoulder straps 35 shown in the collapsed condition against the carrier and also, in phantom, in the extended or usable condition. As will be explained hereinafter, a padded back contacting member is provided for stability and for comfort of the person carrying the device.

Further to be seen in this view is included a detachable, umbrella like shade device 36 and an additional securing strap or seat belt 38. A pouch 39, which may be removable is provided to accommodate paraphernalia necessary when one has a child.

Figure 2:
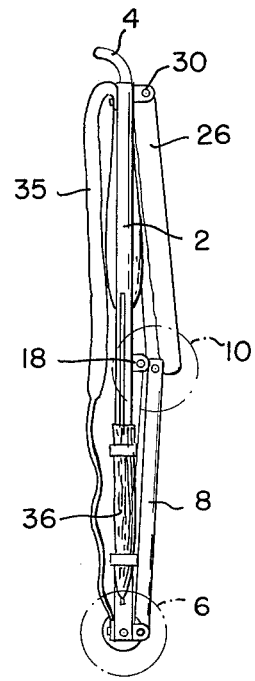
FIG. 2 is the stroller of FIG. 1 in the collapsed storing condition.

Referring now to FIG. 2, the stroller can be seen in its collapsed position with the umbrella 36 removed and stored adjacent the rigid main frame member 2. As seen in this view, the front wheels 10 have been pivoted upwardly to a position adjacent the frame member 2, the upper frame member 26 has been pivoted downwardly adjacent the frame member 2 and the handle telescoped and the entire device occupies very little volume and may be easily stored or carried in the trunk of a vehicle.

Figure 3:
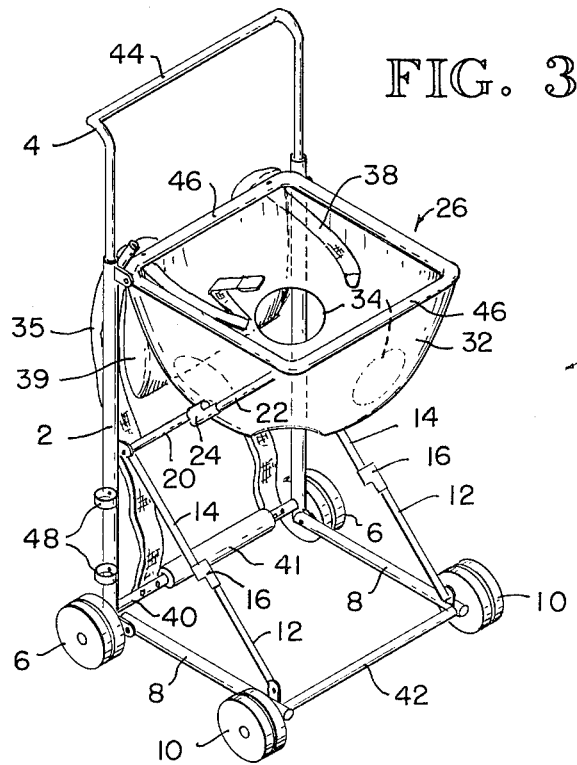
FIG. 3 is an isometric representation of the stroller of FIG. 1.

Referring now to FIG. 3, the interrelationship of the various parts may be more readily seen. Further to be seen are the rigid connector or axles members 40, 42 as well as the interconnecting handle 44 and the lateral portions 46 of the frame member 26. Rear axle 40 is padded as at 41 as explained hereinabove.

Further to be seen in this view are a pair of loops 48 secured to the lower portion of frame member 2 to support the umbrella-type sun shade when in the collapsed condition.

Figure 4:
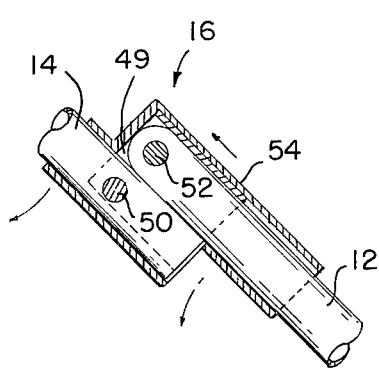
FIG. 4 is an enlarged sectional view of the interconnection of FIG. 1 disclosing the structure which allows the braces to be selectively articulated.

The enlarged view, FIG. 4, discloses a locking joint element shown, for illustrative purposes, on interconnected rigid frame members 12 and 14. The joint element includes a separate surrounding sleeve member 16 supporting the hinge pins 50, 52 such that the members 14 and 12 can move relative to each other. The outermost portion of surrounding member 49 is open adjacent one of the two elements such that the element can pivot away from the other element to collapse and yet is firmly held in place and reinforced in the extended position. For security, a sliding, overlying sleeve 54 is utilized to further assure that the elements will not collapse from their extended position. Sleeve 54 is moved upwardly on the adjacent member to permit articulation and slid downwardly over the joint to prevent accidental collapse.

Referring now to FIG. 5, another embodiment is shown which discloses the rigid main frame member 80 extending at a diagonal to the horizontal and from the set of forward wheels 82 to a rearward adjustable telescoping handle 84 which has removably or pivotally secured thereto a sun shade 86. Similarly but not identical to the previously described embodiment, the rigid spacing member 88 causing separation between the sets of wheels 82 and 90 is pivotally secured to the lower end of rigid member 80 and the ability of support member 92 comprising elements 94 and 96 to articulate allows the wheels 90 to pivot upwardly out of the way when the device is being used as a backpack carrier. A means for securing the wheels in an upward position will be provided.

For total collapse of the stroller, the articulated member 98 consisting of the elements 100, 102 articulates allowing the rigid frame member 104 supporting the baby carrier to collapse downwardly against the frame member resulting in a collapsed unit as shown in FIG. 6. It is to be noted that this model likewise includes a set of padded shoulder straps 106 for utilization when being used as a backpack device, a bag 108 for carrying additional items and a baby support sling or carrier seat 110 and further, the wheels may be double and capable of swiveling can include brakes. The sun shade may be moved upwardly and downwardly with the telescoping adjustable upper handle portion 84 of the rigid member 80. Shade 86 may be removable or pivotable about handle 84 to a collapsed condition.

Referring now to FIG. 7, as shown in this rear elevation view, a padded support element 112 is added rearwardly of the rear axle to provide a stabilizing member against the back of the person carrying the device when the device is used as a backpack carrier. It is to be understood that although not a part of the present invention, various paddings may be added when necessary to enable the device to be efficiently utilized.

Referring now to FIG. 8, a bottom portion of the third embodiment of the present invention is shown wherein the rigid main support 120 extends from the front wheel 121 to form the basis for a telescoping and adjustable handle. The lower rear support 122 as opposed to being articulated as described above is a single member pivotally secured to 120 at the lower end of which is secured a set of wheels 124. The spacing and rigidifying member joining wheel sets 121 and 124 is articulated enabling collapse.

The particular hinge preferred for this structure comprises elements 126 and 128 joined by an overcenter locking member 130 as best seen in FIG. 9. As seen in FIG. 9, elements 126 and 128 pivot within the central locking sleeve member 30 which is open at the bottom such that the members can be lifted upwardly to collapse but when moved to a downwardmost position, they abut pins 132 and the upper limits of the inverted U-shaped collar member 130.

Thus, as can readily be seen, the present invention allows a person to transport a child over smooth terrain in relative safety and comfort by using the device as a stroller whereas when the terrain becomes uneven or when space becomes a premium, it may be immediately converted to a backpacktype carrier without reducing the comfort or safety of the child. When the device is not in use, it may be readily collapsed and stored within a small area. It is to be understood that although not specifically a part of the present invention, items such as swivel wheels, pouches for carrying other articles, brakes and the like may easily be included and are understood to be a part of the preferred embodiment.

What is claimed is:

1. A device, for use in transporting a small child, which may be conveniently carried on the back or rolled on the ground and further may be completely collapsed for transport or storage, said device comprising:

a rigid rectangular main frame member extending from a position at the lower portion of the device to position at the upper portion of the device and forming a handle;

at least two set of independently collapsible auxiliary frame members movable from a first position adjacent the main frame member to a second position extending outwardly therefrom;

pivotable rectangular third frame members, each secured to the main frame member and one set of the independently collapsible auxiliary frame members such that they formed rigid triangular elements having adjacent vertices when viewed from a position to the side of the device, when said auxiliary frame member is in the second position, a set of wheels at the lower end of the rigid main frame and at the lower end of one set of collapsible auxiliary frame members, and a baby supporting seat secured to and enclosed by one of said third rectangular frame members.

2. A device as in claim 1, wherein one of the interconnected sets of the collapsible auxiliary frame members or the third frame members is articulated to allow the other member to remain rigid and pivot about its connection to the main frame member.

3. A device as in claim 1, and further including a pair of shoulder straps connected to the main frame member such that the device may be carried on a persons back.

4. A device as in claim 3, wherein the lower auxiliary frame member and interconnected rectangular frame member may be collapsed during use as a back carried device.

5. A collapsible baby stroller convertible to a back pack type carrier, comprising:
 a pair of identical side frame members each frame member comprised of a pair of similar triangles having one set of adjacent vertices, colinear sides at least one of which is unitary members, each of the triangles having one of side selectively and independently movable from a first operable position to a second collapsed positon substantially parallel and adjacent to the side having a common vertex and each side pivotably connected to its adjacent side,
 a pair of parallel axle means interconnecting the corresponding pair of lowermost base members at opposite ends thereof and supporting wheel means axle adjacent each end of the axle,
 a pair of parallel top frame member interconnecting the corresponding pair of uppermost base members at opposite ends thereof, forming a rectangular rigid upper frame,
 baby supporting pouch means suspended from the upper frame,
 handle means extending upwardly for ease in moving the stroller, and
 strap means to support the partially collapsed stroller in a carrying configuration on a person back.

6. A stroller including wheels and a handle convertible to a back pack baby carrier and completely collapsible for storage, comprising:
 a pair of parallel first rigid leg means extending on an angle from the front wheels diagonally upwardly to the handle,
 two pairs of interconnecting brace members interconnecting respectively; the front and back wheels, and the rigid legs means, forming a first triangle therewith, one of the pair of brace means being selectively and independently articulated, the other of the pair of brace means being rigid,
 a second set of parallel brace means forming a rigid, inverted second triangle having one vertex adjacent a vertex of the first triangle to support a portion of a baby containing pouch, rigid horizontal interconnecting means joining each pair of wheels, the upper end of the rigid pair of legs and the opposite end of the pouch, thus forming a rigid pouch support.

* * * * *